(12) United States Patent
Fan

(10) Patent No.: US 7,295,413 B2
(45) Date of Patent: Nov. 13, 2007

(54) CONTROL CIRCUIT OF POWER SUPPLY WITH SELECTABLE CURRENT-LIMITING MODES

(75) Inventor: Chih-Fu Fan, Hsin-Tien (TW)

(73) Assignee: Zippy Technology Corp., Taipei Hsien (TW)

( * ) Notice: Subject to any disclaimer, the term of this patent is extended or adjusted under 35 U.S.C. 154(b) by 204 days.

(21) Appl. No.: 11/011,057

(22) Filed: Dec. 15, 2004

(65) Prior Publication Data
US 2006/0126247 A1 Jun. 15, 2006

(51) Int. Cl.
*H02H 9/08* (2006.01)
(52) U.S. Cl. ..................................... 361/93.9
(58) Field of Classification Search ................ 361/93.9
See application file for complete search history.

(56) References Cited

U.S. PATENT DOCUMENTS

| | | | | |
|---|---|---|---|---|
| 4,514,619 A * | 4/1985 | Kugelman | ................ | 219/483 |
| 4,618,780 A * | 10/1986 | Ikoma et al. | ............... | 307/130 |
| 5,315,256 A * | 5/1994 | Schuyler | .................. | 324/511 |
| 5,324,989 A * | 6/1994 | Thornton | ................. | 307/35 |
| 5,617,285 A * | 4/1997 | Zitta | ........................ | 361/92 |
| 5,834,925 A * | 11/1998 | Chesavage | ................ | 323/272 |
| 5,982,594 A * | 11/1999 | Huczko | ................... | 361/54 |
| RE37,716 E * | 5/2002 | Sutardja et al. | ............. | 341/120 |
| 6,410,997 B1 * | 6/2002 | Sjursen et al. | ............... | 307/130 |
| 7,075,373 B2 * | 7/2006 | Briskin et al. | ............... | 330/298 |
| 2004/0232899 A1 * | 11/2004 | Herbert | ................... | 323/282 |
| 2005/0060587 A1 * | 3/2005 | Hwang et al. | .............. | 713/300 |
| 2005/0237688 A1 * | 10/2005 | Wong et al. | ............... | 361/93.1 |

* cited by examiner

*Primary Examiner*—Michael Sherry
*Assistant Examiner*—Ann T. Hoang
(74) *Attorney, Agent, or Firm*—Birch, Stewart, Kolasch & Birch, LLP

(57) ABSTRACT

The present invention relates to a control circuit of power supply with selectable current-limiting modes. Via a select circuit in the control circuit of the power supply of the present invention, the user himself can select and switch the operating mode of the current-limiting compare circuit to be one to one, one to multiple, multiple to multiple, or multiple to one mode in order to enable the loads to be compared by an individual set or integrated sets of current-limiting compare circuits; thereby, according to the power usage conditions of the various combinations of the loads, the user himself can select and switch the current-limiting mode in just a single power supply of the present invention, and further, the manufacturer is needless to fabricate variant specifications of power supplies.

3 Claims, 5 Drawing Sheets

CONTROL CIRCUIT OF POWER SUPPLY WITH SELECTABLE CURRENT-LIMITING MODES

FIELD OF THE INVENTION

The present invention relates to a control circuit of power supply with selectable current-limiting modes, particularly to a select circuit, which possesses a current-limiting compare circuit to determine whether a power supply is loaded over an energy-limiting level in order to decide whether the power supply outputs the power normally or shunts the power's output.

BACKGROUND OF THE INVENTION

Generally speaking, as the DC voltages needed by the motherboard and the peripheral devices (such as the floppy disc drive, hard disc drive, optical disc drive, electric fan, etc.) of the computer are variant, the power supply, which provides the DC power for the computer system, has to output at least two different levels of DC power to satisfy the variant voltage demands of various devices in the computer system.

Recently, as the computer's working speed demanded by the user becomes higher and higher, the electric power needed by CPU and the peripheral devices in the computer system grows responsively; therefore, the power supply of the computer system has to provide more power output. However, owing to the variation of the computer design, the power of the output ports have an energy-limiting level (maximum output power Max VA) in some systems; thus, these output ports need the design of multiple sets of current-limiting compare units 31 to satisfy those users who demand high-grade safety standard. In general, for a power supply, there is an energy hazard standard, such as in SSI or UL, which requires that the highest power output by the power supply should not exceed 240 VA, in order to secure the user's safety.

The computer systems shift rapidly, and the power demand is higher and higher. For the user who just persists in the high-grade safety standard, the only way to satisfy the power demand is to increase more and more current-limiting compare units 31 so as to raise the power output. However, this is not a good method in the long run as the more current-limiting compare units 31, the harder the design of the power supply, and the cost of the power supply will be further raised as the users who require the high-grade safety standard are still the fewer. Therefore, if the power demand of the computer system keeps on rising, the system manufacturer will choose a lower-grade safety standard to design the system, i.e. to utilize less or even only one current-limiting compare unit 31 in the system, and the case will return to the starting point. The current power supply having the current-limiting compare units 31 in the market will be described below with the drawing and its connecting and operating manner.

Refer to FIG. 1 a block diagram of the conventional power supply with a single current-limiting compare unit 31. As shown in the drawing, the conventional power supply comprises: a power output circuit 10, which provides the power, wherein a constant current source 32 and a reference resistance 34 generate a current-limiting reference value Va and a sampling circuit having a level resistance 33 generates a current-limiting compare value Vb; the current-limiting reference value Va and the current-limiting compare value Vb are separately coupled to two input terminals of the compare unit 31 to compare each other in order to determine whether the compare unit 31 should output normal-state signal or false-state signal to the power output circuit 10. If the current-limiting compare value Vb is equal to or less than the current-limiting reference value Va, the compare unit 31 outputs a high electric signal to enable the power output circuit 10 of the power supply to enter a shut-down state to shut off the power of the computer. Conversely, if the current-limiting compare value Vb is more than the current-limiting reference value Va, the compare unit 31 outputs a low electric signal to the power supply to enable the power supply to operate normally, and thus the user can continue to use the computer. it is to be noted that in this drawing, the compare unit 31 takes the integrated current-limiting compare value Vb of all the power output to multiple loads 40 to undertake the comparison.

As shown in FIG. 2, another specification of power supply adopts multiple sets of compare units 31, wherein each individual set of compare unit 31 operates in the same mode as that in FIG. 1. This specification of power supply is designed according to the highest-grade design standard for the upmost user safety level, and even only a single set of compare unit 31 overloaded, the power supply enters a shut-down state to shut off the power of the computer in order to protect the user's safety; however, far those persons skilled in the computer technology, this way will limit the configuration of the devices with the loads 40.

It is to be known from those described above that there are two kinds of compare units 31 of the power supply in the current market; one is the multiple-set compare unit 31 for the general computer user, and the other is the single-set compare unit 31 for the computer technician; thus, the manufacturer of the power supply has to design variant specifications of power supplies to satisfy the need of various users, which not only makes the products lowly compatible and the fabrication harder, but also consumes higher cost. Thus, the problems mentioned above are those the manufacturer desires to solve.

SUMMARY OF THE INVENTION

The primary objective of the present is to provide a control circuit of power supply with selectable current-limiting modes in order to solve the aforementioned problem. Via a select circuit in the control circuit of the power supply of the present invention, the user himself can select and switch the operating mode of the current-limiting compare circuit to be one to one, one to multiple, multiple to multiple, or multiple to one mode in order to enable the loads to be compared by an individual set or integrated sets of current-limiting compare circuits; thereby, according to the power usage condition of the load combinations, the user can select and switch the current-limiting mode in a single power supply of the present invention; before the product is delivered, according to the power output condition of the load combinations required by the customer, the manufacturer can also select and switch the current-limiting mode in a single power supply of the present invention, and the manufacturer is needless to fabricate variant specifications of power supplies.

Further scope of the applicability of the present invention will become apparent from the detailed description given hereinafter. However, it should be understood tat the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The detailed description and technical contents of the present invention will be stated below in conjunction with the attached drawings.

Figure 1:
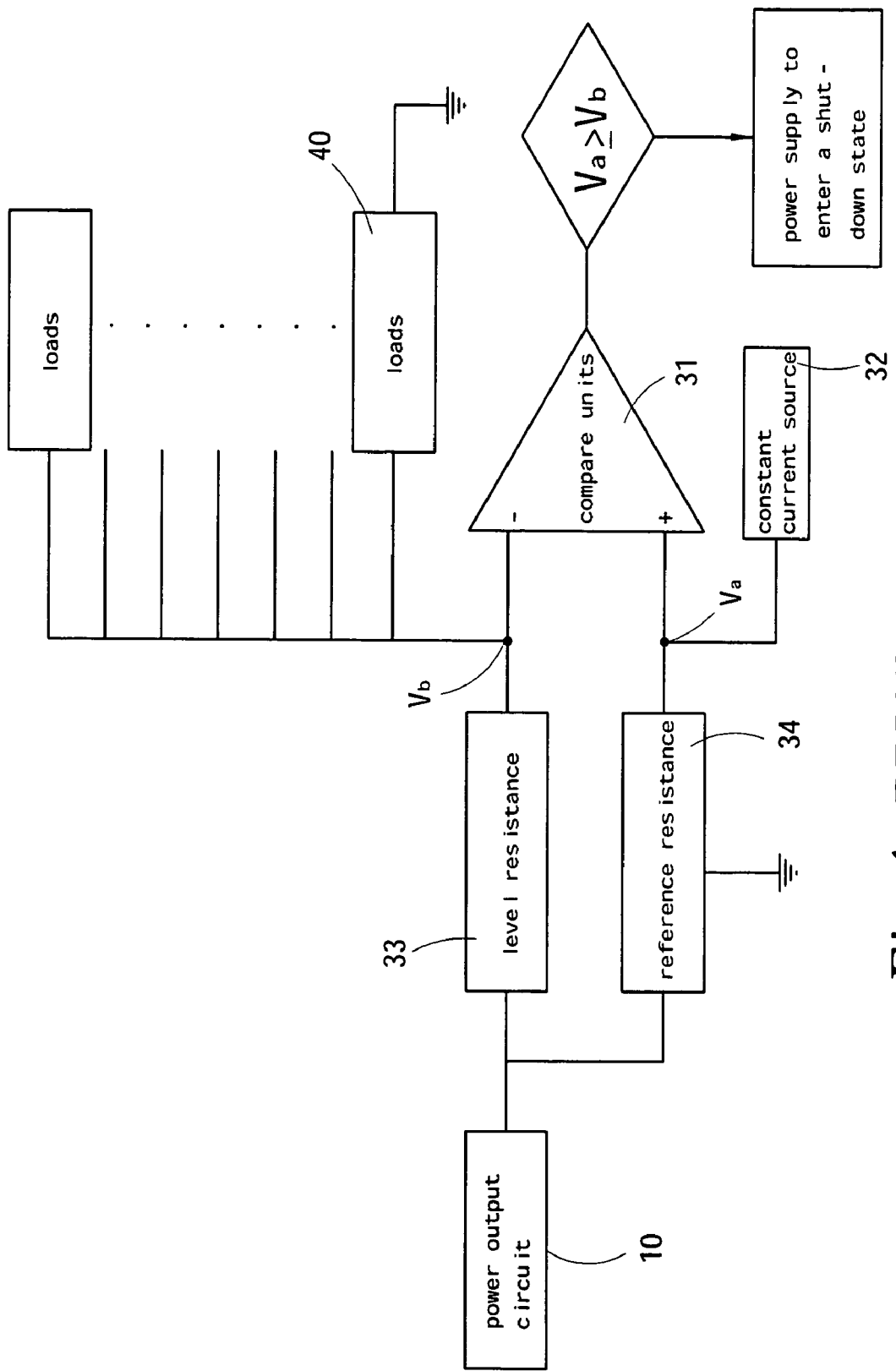
FIG. 1 is a schematic diagram of the conventional control circuit with a single current-limiting compare unit.
Figure 2:
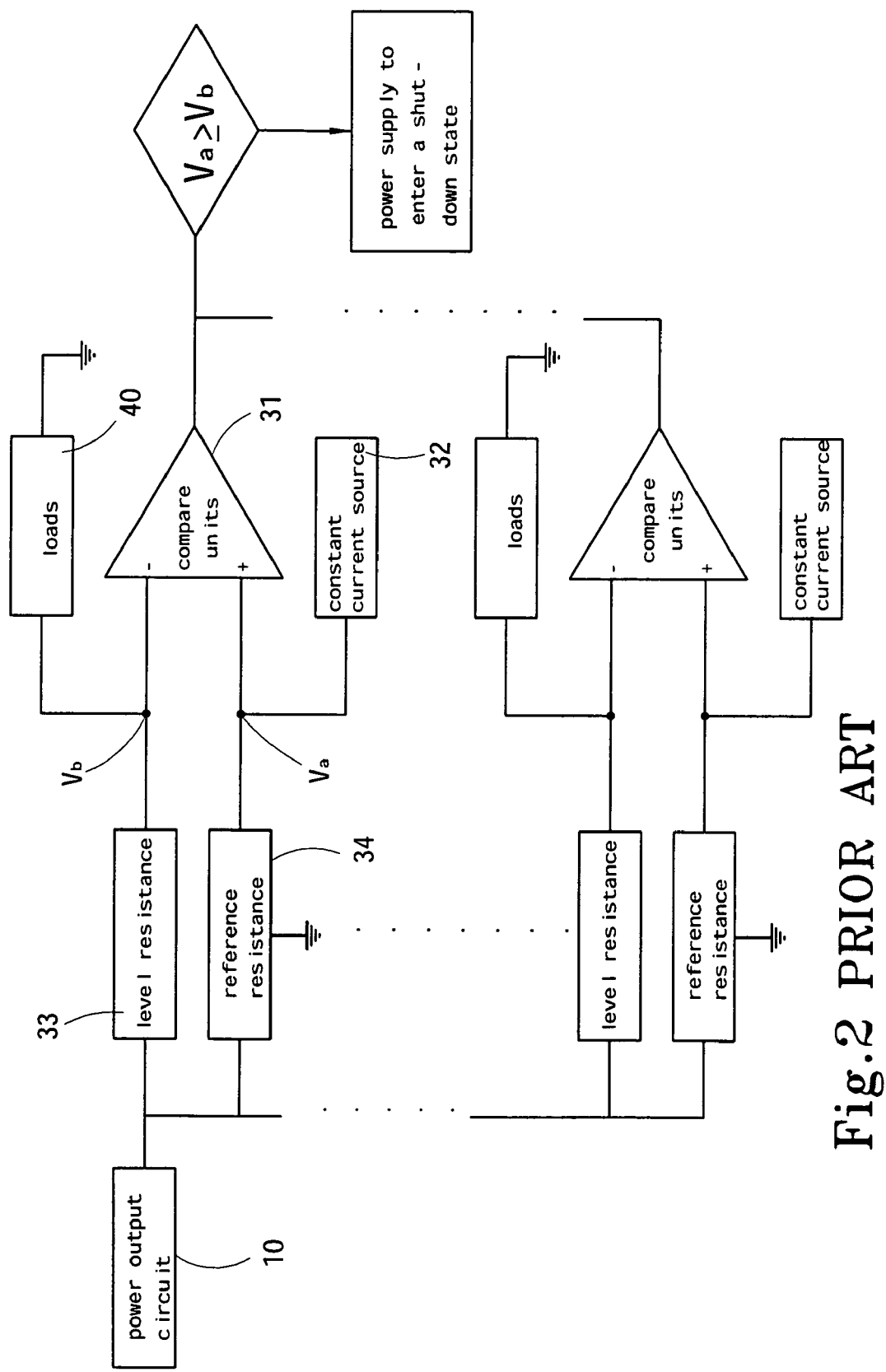
FIG. 2 is a schematic diagram of the conventional control circuit with multiple current-limiting compare units.
Figure 3:
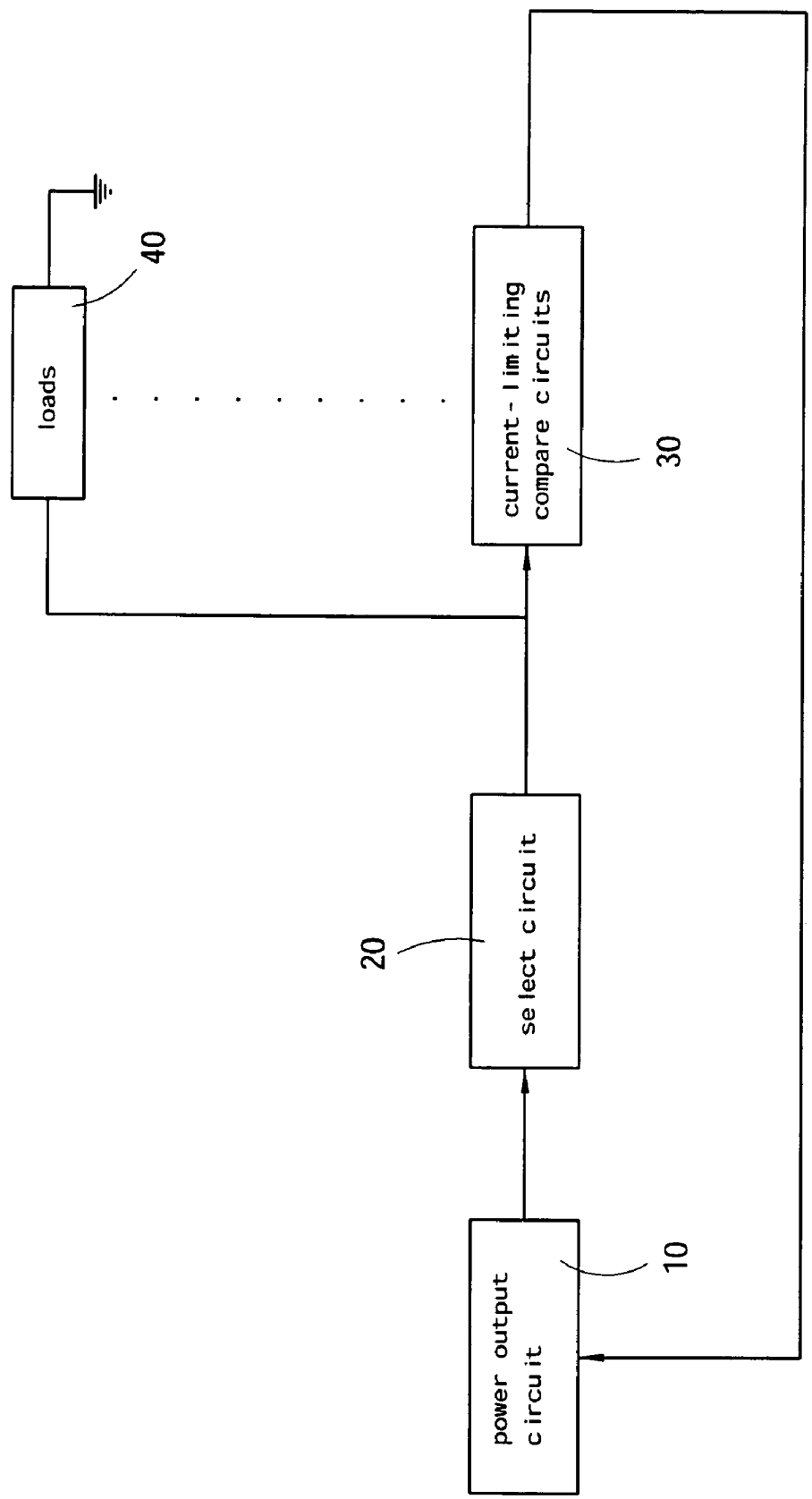
FIG. 3 is a schematic block diagram of the total circuitry of the present invention.
Figure 4:
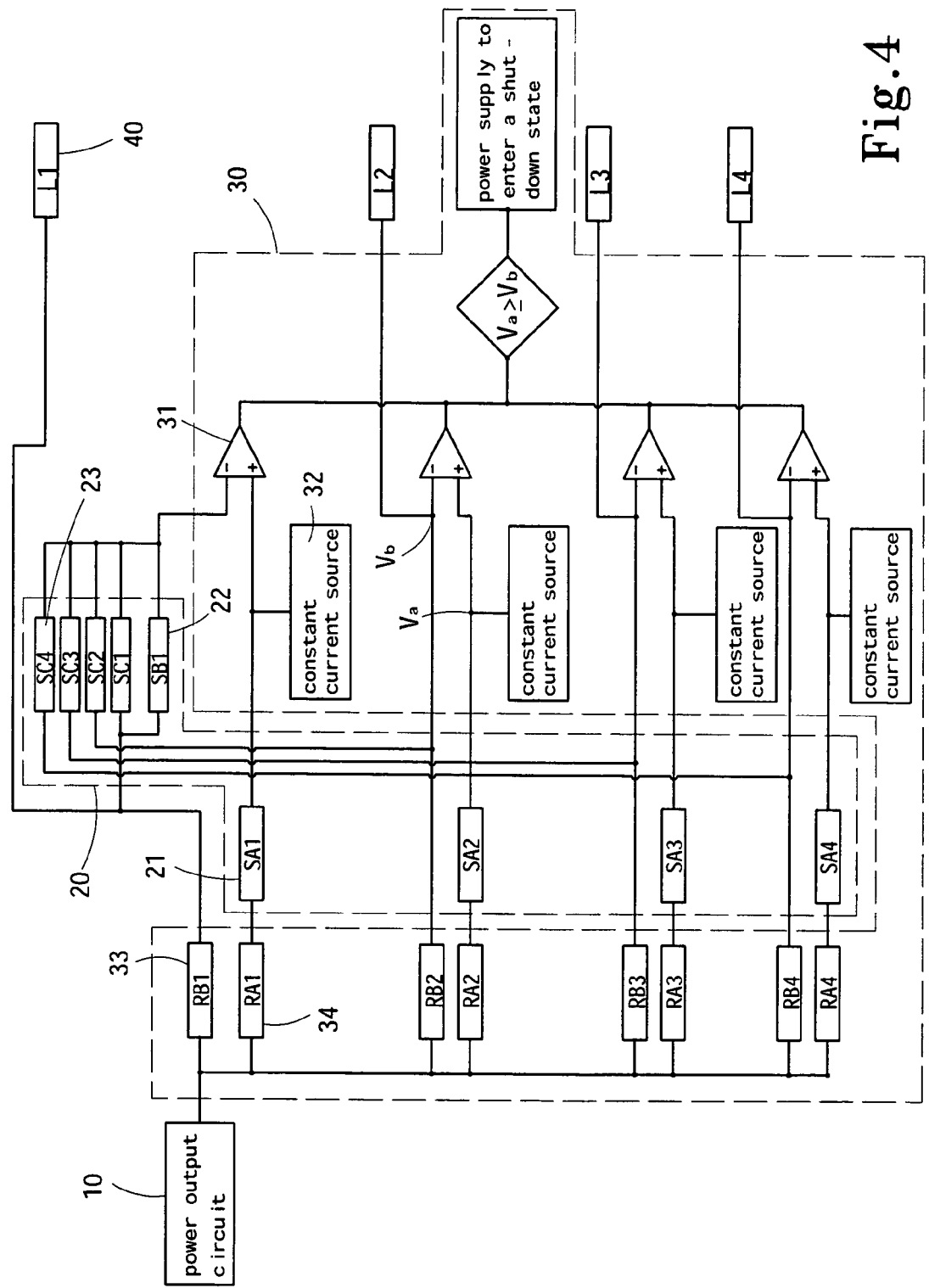
FIG. 4 is a schematic detailed block diagram of the circuit of the present invention.
Figure 5:
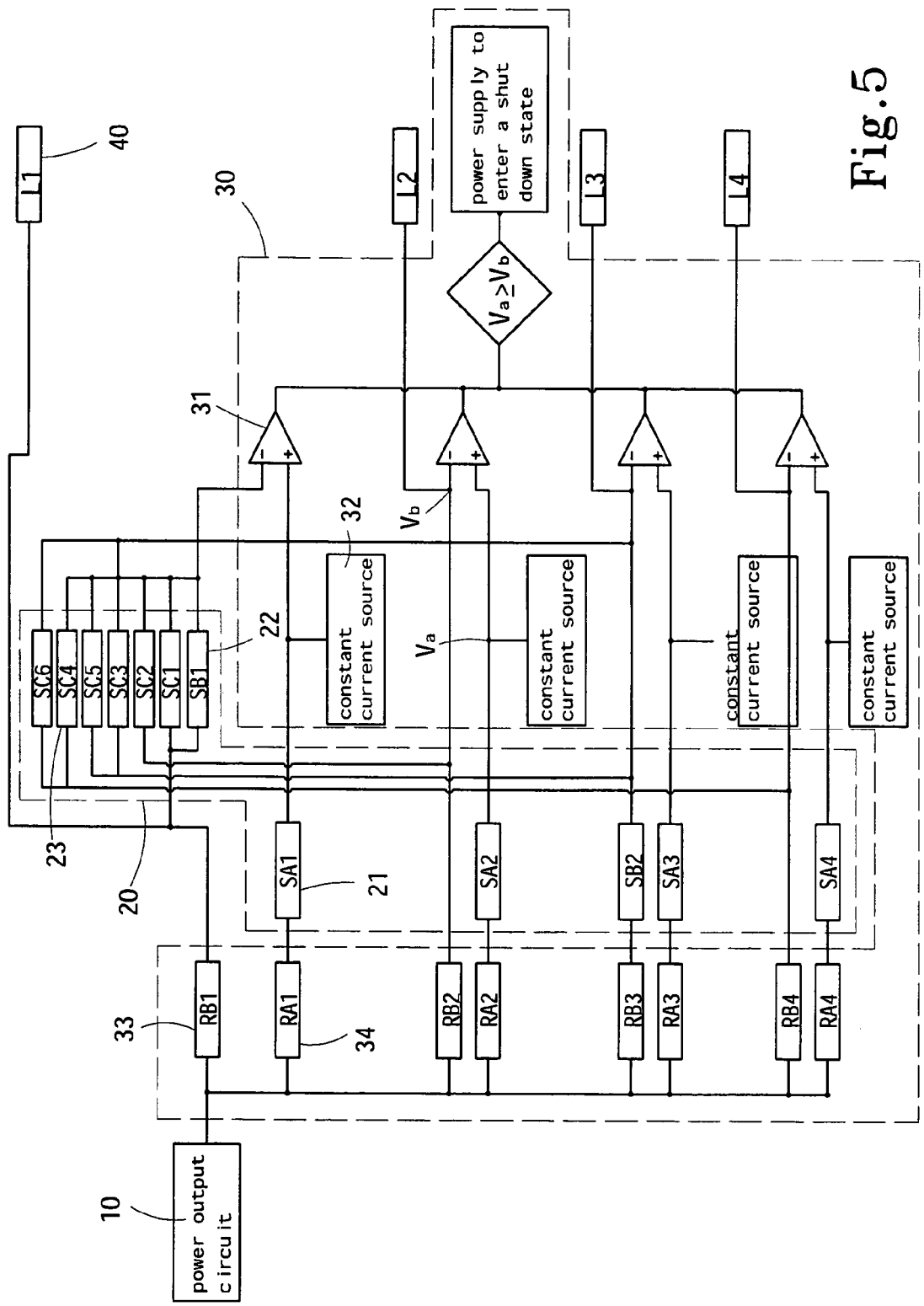
FIG. 5 is a schematic detailed block diagram of the circuit of another embodiment of the present invention.

Refer to FIG. 3 and FIG. 4. The present invention is a control circuit of power supply with selectable current-limiting modes, wherein the power supply possesses a power output circuit 10 that provides multiple sets of power outputs to drive multiple loads 40, and the power output circuit 10 can output the power in one to multiple mode or multiple to multiple mode. A current-limiting compare circuit 30 is disposed between the power output circuit 10 and the load 40 to determine whether the power output circuit 10's outputting the power to drive the load 40 is normal or false, wherein the power output circuit 10 is coupled to a select circuit 20, which provides the current-limiting compare circuit 30 with the operating mode of one to one, multiple to multiple, one to multiple, or multiple to one in order to enable the loads 40 to be compared by a single or integrated current-limiting compare circuits 30.

The power output circuit 10 and the current-limiting compare circuit 30 of the present invention have variant designs, which are exemplified by the embodiment described below.

The current-limiting compare circuit 30 adopts a voltage-drop way to perform the compare logic operation. A compare unit 31 is installed between each power output and each load 40, and one of the input terminals of the compare unit 31 is coupled to a constant current source 32 and a reference resistance 34, which generate a current-limiting reference value Va, and the other input terminal is coupled to a power input and a level resistance 33, which generate a current-limiting compare value Vb. Comparing the current-limiting reference value Va with the current-limiting compare value Vb determines that the compare unit 31 outputs whether a normal-state signal or a false-state signal to the power output circuit 10. In the select circuit 20, a first switch element 21 is disposed in the line of the compare unit 31's output terminal that generates the current-limiting reference value Va, and a second switch element 22 is disposed in the line of the compare unit 31's input terminal that generates the current-limiting compare value Vb, and the line of the compare unit 31's input terminal that generates the current-limiting compare value Vb is coupled to a third switch element 23, which is integrated to connect at least a line of the compare unit 31's input terminal that generates the current-limiting compare value Vb. The first switch element 21, the second switch element 22, and the third switch element 23 mentioned above are switch circuits.

According to the preferred embodiment of the present invention, the single power output circuit 10 (or the four sets of power output circuits 10) provides four sets of power outputs for four loads 40; four compare units 31, four first switch elements 21, and four third switch elements 23 are separately disposed between the power outputs and the loads 40, and a second switch element 22 is disposed in the first set of power line, and the third switch elements 23 are integrated to connect the first set of power line where the second switch element 22 is disposed.

This preferred embodiment has the following operating modes:

Mode one, wherein four current-limiting protection devices operate individually, and wherein SA1, SA2, SA3, SA4, and SB1 are on, and SC1, SC2, SC3, and SC4 are off, and wherein each of the loads L1, L2, L3, and L4 is under an individual current-limiting protection separately; for example, when the output power is at 12V and the maximum current of each load 40 is limited to 20 A, and when the energy hazard standard is set to be 240 VA max, and supposing the constant current source 32 is 100 uA and the each of the level resistance 34 RA1, RA2, RA3 and RA4 is 0.002 Ω, then the voltage drop will be 0.04V, i.e. the current-limiting reference value Va will be 11.96 V; when any one of the loads 40 is overloaded owing to abnormal operation, etc. and has a current over 20 A, such as 25 A, the current-limiting compare value Vb will voltage-drop to 11.95V; after the current-limiting reference value Va and the current-limiting compare value Vb each separately from two input terminals of the compare unit 31 are compared by the compare unit 31, the result is then that the current-limiting reference value Va is larger than the current-limiting compare value Vb, and an interrupt signal (high voltage) will be output to the power supply to enable the power supply to enter into a close state and stop providing the power for the load 40; in this mode, corresponding to each load 40, there are an individual current-limiting compare value Vb and an individual current-limiting reference value Va sent to the compare unit 31 for comparison, and even just only one of the loads 40 having an abnormal condition, the power supply will stop operating in order to avoid the energy hazard so as to provide the best safety security for the user;

Mode two, wherein three sets of current-limiting protection devices are integrated to operate cooperatively and the other one operates individually, and wherein SA1, SA4, SC1, SC2, and SC3 are on, and SA2, SA3, SB1, and SC4 are off, and wherein the loads L1, L2, and L3 are under an integrated current-limiting protection, and the load L4 is under an individual current-limiting protection, and wherein in the case of L1, L2, and L3, the calculation of the integrated current-limiting compare value Vb is based on the level resistances 33 RB1, RB2, and RB3; similar to those assigned values in Mode one, and supposing L1's current is 25 A, L2's 18 A, and L3's 12 A, the current-limiting compare value Vb=12V−[(25 A+18 A+12 A)*0.002 Ω]/3=11.963V, and the current-limiting reference value Va=12V−(100 uA*400 Ω)=11.96V; in this mode, it is to be known from those described above that as the loads L1, L2, and L3 are under the integrated current-limiting protection, only the overload of the individual load L1 will not enable the power supply to shut down, and only when the integrated output power of the loads L1, L2, and L3 are overloaded or the individual current-limiting protection load L4 is overloaded, the power supply can be enabled to shut down; this mode can also select the case that two loads are under the integrated current-limiting protection, and each of the other two loads is separately under the individual current-limiting protection;

Mode three, wherein all four sets of current-limiting protection devices are integrated to operate cooperatively, and wherein SA1, SC1, SC2, SC3, and SC4 are on, and SA2, SA3, SA4, and SB1 are off, and wherein all the loads 40 are under one integrated current-limiting protection;

the calculation method of Va and Vb is similar to that in Mode two; just only an individual load's energy hazard will not necessarily enable the power supply to shut down; and only the overload of the total integrated output power can enable the power supply to shut down;

in addition to the aforementioned one to one and multiple to one modes of the current-limiting protections, the current-limiting protection can also be of multiple to multiple or one to multiple mode;

Mode four, wherein two of those four sets of current-limiting protection devices are integrated to operate cooperatively and the other two are also integrated to operate cooperatively, and wherein two loads are under the integrated current-limiting protection, and the other two loads are also under the integrated current-limiting protection, and supposing SA1, SA3, SC1, SC2, SC5, and SC6 are on, and SA2, SA4, SB1, SB2, SC3, and SC4 are off, the loads L1 and L2 will be under the integrated current-limiting protection, and the other two loads L3 and L4 will also be under the integrated current-limiting protection; in this mode, only when the total integrated energy of the loads L1 and L2 is overloaded, the respective compare unit 31 can output the false signal to the power supply, and also only when the total integrated energy of the loads L3 and L4 is overloaded, the respective compare unit 31 can output the false signal to the power supply; this mode adopts the multiple to multiple mode of current-limiting protection.

Those mentioned above are only the preferred embodiments of the present invention, and not intended to limit the scope of the present invention. Any modification and variation according to the claims of the present invention is to be included within the scope of the present invention.

What is claimed is:

1. A control circuit of power supply with selectable current-limiting modes, wherein said power supply comprises a power output circuit that provides multiple sets of power outputs to drive multiple loads, and a current-limiting compare circuit is disposed between said power output circuit and each of said loads to determine whether said power output circuit's outputting power to drive said loads is in a normal or a false state, wherein each of said current-limiting compare circuits is coupled to a select circuit, wherein said select circuit provides said current-limiting compare circuits with the operating mode of one to one, one to multiple, multiple to multiple, or multiple to one to enable said loads to be compared by individual said current-limiting compare circuit or integrated said current-limiting compare circuits, whereby when the power supply shuts down, all current-limiting circuits are not shut off;

said current-limiting compare circuit having a compare unit installed between each said power output and corresponding said load, and one input terminal of said compare unit being coupled to a constant current source and a reference resistance to generate a current-limiting reference value, and the other input terminal of said compare unit being coupled to a power input terminal and a level resistance to generate a current-limiting compare value, and via comparing said current-limiting reference value with said current-limiting compare value, whether a normal or a false state signal is to he output by said compare unit is determined and sent to said power output circuit; and in the select circuit, a first switch element is disposed in the output terminal of the compare unit that generates the current-limiting reference value, and a second switch element is disposed in the input terminal of the compare unit that generates the current-limiting compare value, and the line of the compare unit's input terminal that generates the current-limiting compare value is coupled to a third switch element, which is integrated to connect at least a line of the compare unit's input terminal that generates the current-limiting compare value.

2. The control circuit of power supply with selectable current-limiting modes according to claim 1, wherein said current-limiting compare circuit adopts a voltage-drop way to perform a logic operation.

3. The control circuit of power supply with selectable current-limiting modes according to claim 1, wherein said fist switch element, said second switch element, and said third switch element are switch circuits.

* * * * *